(12) United States Patent
Hayakawa et al.

(10) Patent No.: US 6,260,677 B1
(45) Date of Patent: Jul. 17, 2001

(54) DAMPER WITH VEHICLE HEIGHT ADJUSTING FUNCTION

(75) Inventors: Yukio Hayakawa; Kiyoshi Nakahara, both of Tochigi-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/485,103

(22) PCT Filed: Jul. 30, 1999

(86) PCT No.: PCT/JP99/04104

§ 371 Date: Feb. 3, 2000

§ 102(e) Date: Feb. 3, 2000

(87) PCT Pub. No.: WO00/07835

PCT Pub. Date: Feb. 17, 2000

(30) Foreign Application Priority Data

Aug. 3, 1998 (JP) .................................................. 10-219297

(51) Int. Cl.[7] ....................................................... F16F 9/42
(52) U.S. Cl. .............................. 188/274; 188/276; 267/34; 267/64.15
(58) Field of Search ..................................... 188/276, 277, 188/278, 274, 299.1, 322.5; 267/64.11, 64.13, 64.15, 64.16, 118, 121, 34

(56) References Cited

U.S. PATENT DOCUMENTS

| | | | | |
|---|---|---|---|---|
| 2,805,854 | * | 9/1957 | Gaebler | ................................. 267/64 |
| 4,477,062 | * | 10/1984 | Smeltzer et al. | ................... 267/64.28 |
| 5,927,071 | * | 7/1999 | Asanuma et al. | ........................ 60/396 |
| 6,170,621 | * | 1/2001 | Nakahara et al. | .................... 188/274 |
| 6,179,098 | * | 1/2001 | Hayakawa et al. | ................... 188/274 |

* cited by examiner

Primary Examiner—Robert J. Oberleitner
Assistant Examiner—Bradley King
(74) Attorney, Agent, or Firm—Armstrong, Westerman, Hattori, McLeland & Naughton, LLP

(57) ABSTRACT

On an outside of a damper main body (1) of an inverted type of damper, a cylindrical case (12) which is coupled to a damper rod (2) is provided so as to be movable up and down. Between the damper main body (1) and the case (12), there is formed a pressure chamber (13) filled with a pressure medium of low boiling point which varies between a gaseous state and a liquid state. By use of a heater (16) which is disposed inside the pressure chamber (13) the pressure medium is heated and evaporated, whereby the vehicle height is increased by the vapor pressure of the pressure medium. In the above-described damper with a vehicle height adjusting function, the heater (16) is arranged to be easily mounted and dismounted to thereby improve the ease with which the maintenance is performed. The influence on the suspension stoke which is caused by the presence of the heater (16) is also minimized. The heater is formed into a bar heater (16). This bar heater (16) is horizontally inserted into the bottom of the pressure chamber (13) through a connector portion (12d) which is provided in the case (12). A tail portion of the bar heater (16) is fitted into the connector portion (12d) in a threaded manner.

5 Claims, 2 Drawing Sheets

DAMPER WITH VEHICLE HEIGHT ADJUSTING FUNCTION

DESCRIPTION

1. Technical Field

The present invention relates to that damper with a vehicle height adjusting function which is built in a suspension of a vehicle such as a motor vehicle or the like.

2. Background Art

As this kind of damper, the applicants of the present patent application have earlier proposed in a Japanese Patent Application No. 115550/1998 an inverted type of damper comprising a damper main body and a damper rod which is inserted into the damper main body from a bottom side so as to be movable up and down. On an outside of the damper main body, a cylindrical case which is coupled to the damper rod is provided so as to be movable up and down. Between the damper main body and the case, there is formed a pressure chamber which is filled therein with a pressure medium (refrigerant) which varies between a liquid state and a gaseous state. An electric heater is provided inside the pressure chamber. By means of this electric heater the pressure medium is heated and evaporated to thereby increase the vapor pressure inside the pressure chamber. The damper rod is thus pushed down relative to the damper main body by the vapor pressure to thereby increase the vehicle height.

In this damper, the electric heater is formed into a cylindrical shape and the electric heater is contained inside the pressure chamber in a manner to enclose the damper rod.

In the damper of this prior application, however, there is a disadvantage in that the electric heater cannot be mounted or dismounted unless the case is removed, resulting in a poor ease with which the maintenance of the electric heater can be performed. Further, since the cylindrical heater is vertically disposed in the bottom portion of the pressure chamber, there is a disadvantage in that, in preventing the damper main body from interfering with the heater, the suspension stroke is limited.

In view of the above points, the present invention has an object of providing an improved damper over the above-described damper of the earlier application by making it possible to easily mount or dismount the heater, thereby improving the ease with which the maintenance can be performed, as well as to minimize the influence on the suspension stroke.

DISCLOSURE OF INVENTION

In order to attain the above-described object, the present invention is a damper with a vehicle height adjusting function, the damper being of an inverted type which is provided with a damper main body and a damper rod which is inserted from a bottom side into the damper main body so as to be movable up and down, wherein a cylindrical case which is coupled to the damper rod is provided outside the damper main body so as to be movable up and down, wherein a pressure chamber containing therein, in a hermetically sealed manner, a pressure medium which varies between a liquid state and a gaseous state is provided between the damper main body and the case, and wherein an electric heater is provided inside the pressure chamber to heat and evaporate the pressure medium, characterized in: that the electric heater is formed into a bar heater; and that the bar heater is horizontally inserted into a bottom portion of the pressure chamber through a connector portion which is provided in the case such that a tail portion of the bar heater is fitted in a threaded manner into the connector portion.

According to the present invention, the bar heater can be easily mounted or dismounted through the connector portion and, therefore, the ease with which the maintenance of the electric heater can be performed is improved. Further, the bar heater is arranged to be disposed in the horizontal posture at the bottom portion of the pressure chamber. As a result, the space as seen in the vertical direction between the bar heater and the damper main body can be secured large enough, and the influence on the suspension stroke becomes smaller.

By the way, the damper is arranged to be mounted on the vehicle in a state inclined inward as seen in a width direction of the vehicle. Here, if the bar heater is provided so as to be positioned on an inner side, as seen in a width direction of a vehicle, relative to the damper rod in a state in which the damper is mounted on the vehicle, the bar heater will not be exposed to the liquid surface of the pressure medium even if the damper is inclined inward. The pressure medium in the liquid phase can therefore be surely heated and evaporated by the bar heater.

Further, if a spacer member having formed therein a recessed groove for containing therein the bar heater is provided on an inner bottom of the pressure chamber, the pressure medium in the liquid phase will stay in the recessed groove. Therefore, even if the angle of inclination of the damper varies in a state in which the liquid surface level is considerably low, the bar heater will not be exposed to the liquid surface of the pressure medium. As a result, the amount of filling the pressure medium into the pressure chamber can be reduced to the extent possible. The cost of the damper can thus be reduced and the cost to recover the pressure medium at the time of scrapping the damper can also be reduced.

Further, if the spacer member is made of a resin, the thermal insulating property can be secured. The heat of the bar heater will thus be hardly dissipated outside. As a result, the heating efficiency of the pressure medium can advantageously be improved.

By the way, when the ambient temperature becomes high, the vapor pressure of the pressure medium which is hermetically filled into the pressure chamber increases, and the vehicle height consequently becomes large. As a solution, it is considered to provide a jacket portion which comes into thermal contact with the pressure chamber. When the ambient temperature becomes high, a coolant is then caused to flow by a pump through the jacket portion. The pressure medium is thus cooled and condensed to lower the vapor pressure, whereby the vehicle height is prevented from becoming large at the time of high ambient temperature. This arrangement, however, requires not only the pump but also a heat exchanger for cooling purpose in which the coolant heated in the jacket portion is cooled. This results in a higher cost.

In such a case, if that piping member for the coolant which is connected to the jacket portion is combined with a suspension arm to which the damper rod is coupled, the suspension arm functions as a heat radiating fin which is thermally connected to the piping member. The coolant which has been raised in temperature in the jacket portion can be effectively cooled by the cooling effect of the running wind that flows along the surface of the suspension arm. In this manner, even if a special heat exchanger for cooling purpose is not provided, the coolant that has been cooled is caused to flow through the jacket portion. The vehicle height can thus be prevented from becoming large at the time of high ambient temperature.

BEST MODE FOR CARRYING OUT THE INVENTION

Figure 1:
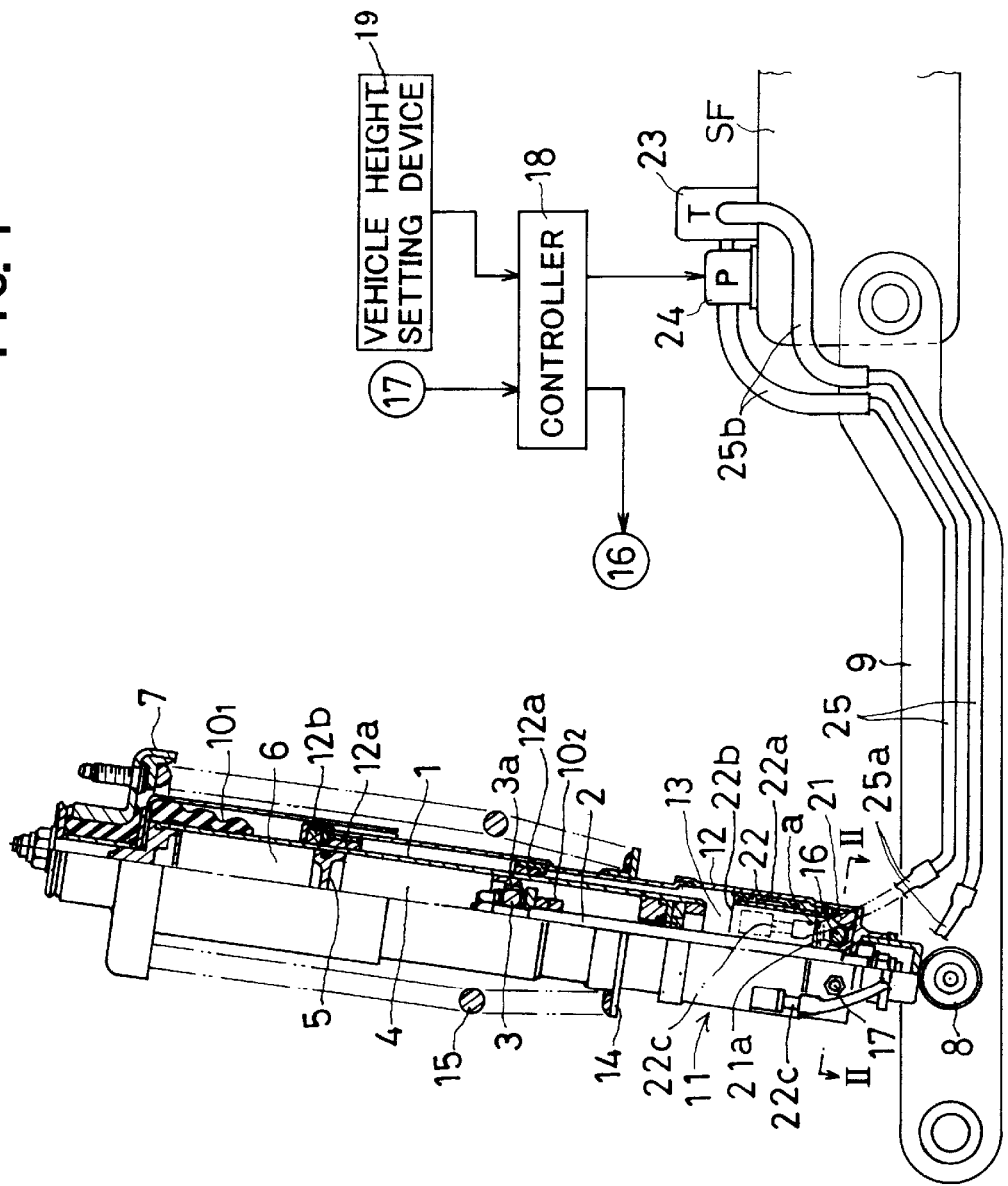
FIG. 1 is a side view, half shown in section, of an example of a damper of the present invention.

With reference to FIG. 1, numeral 1 denotes a damper main body which is cylindrical in shape. A damper rod 2 is inserted from a bottom side into the damper main body 1 so as to be movable up and down. On an upper end of the damper rod 2 there is mounted a damper piston 3 having an orifice 3a therethrough. Inside the damper main body 1 there are formed an oil chamber 4 into which the damper piston 3 is inserted, and a gas chamber 6, on an upper portion, which is partitioned by a free piston 5 relative to the oil chamber 4. In this manner, an inverted type of damper is constituted as a whole. The damper main body 1 is then coupled to a vehicle body through a bracket 7 which is mounted on an upper end of the damper main body 1, and the damper rod 2 is coupled to a suspension arm 9 through a bush 8 which is mounted on a lower end of the damper rod 2. It is thus so arranged that a damping force against the vibrations of the suspension arm 9 in the vertical direction can be obtained. Further, a bump stop rubber $10_1$ is provided on a lower side of the bracket 7, and a rebound stop rubber $10_2$ is provided on a lower side of the damper piston 3 so that a stopper function can be obtained against the bumping motion (contraction motion) and the rebounding motion (extension motion) of the damper. In the figure, a reference letter SF denotes a subframe on which a base end of the suspension arm 9 is swingably mounted.

Further, the damper is provided with a vehicle height adjusting section 11 which is filled therein with a pressure medium (refrigerant) of low boiling point such as Freon R134a, R152a, or the like which varies between a liquid phase and a gaseous phase. The vehicle height adjusting section 11 is constituted by coupling a cylindrical case 12 which is provided on an outside of the damper main body 1, to the damper rod 2 at a lower end portion of the case 12 in a hermetically sealed manner.

The case 12 is in sliding contact with an outer periphery of the damper main body 1 through a pair of upper and lower guide rings 12a, 12a. Further, on an upper end of the case 12 there is mounted a sealing member 12b which seals the clearance between the damper main body 1 and the case 12. A hermetically closed pressure chamber 13 is thus defined between the damper main body 1 and the case 12. A pressure medium mixed with an oil for lubrication purpose is filled into the pressure chamber 13. In addition, a spring receiving member 14 is mounted on an outer periphery in an intermediate portion of the case 12. A suspension spring 15 is interposed between the spring receiving member 15 and the bracket 7.

Figure 2:
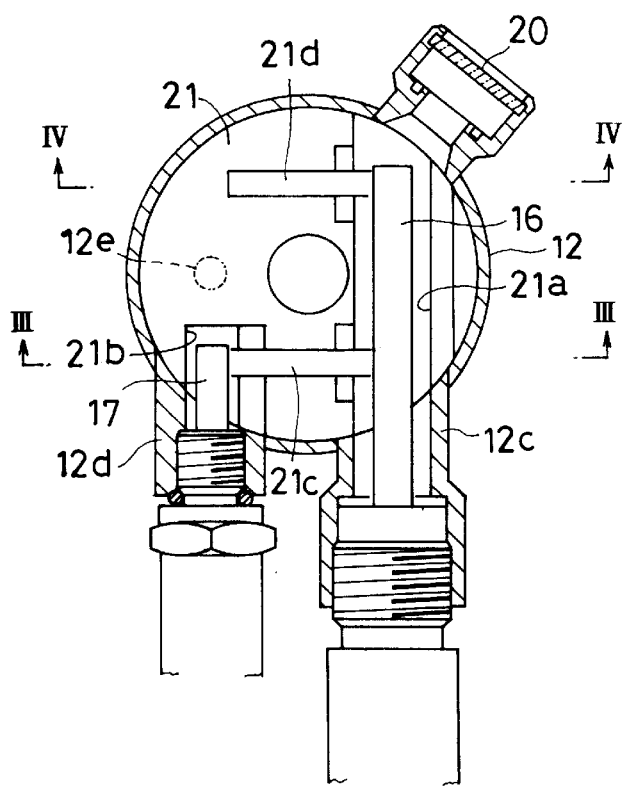
FIG. 2 is an enlarged plan view taken along the line II—II in FIG. 1.

At the bottom of the pressure chamber 13, there are provided, as shown in FIG. 2, an electric heater 16 which is positioned on an inner side as seen in the width direction of the vehicle relative to the damper rod 2, and a temperature sensor 17 which is constituted by a thermocouple and which is positioned on an outer side as seen in the width direction of the vehicle relative to the damper rod 2. When the electric heater 16 is charged with electricity, the pressure medium "a" in the liquid state inside the pressure chamber 13 is heated and evaporated. As a result, the vapor pressure inside the pressure chamber 13 rises, and the damper rod 2 is pushed down by the vapor pressure relative to the damper main body 1. The damper thus operates to the side of extension, whereby the vehicle height increases. Here, a certain correlation is established between the vapor pressure of the pressure medium and the temperature of the pressure medium inside the pressure chamber 13. The temperature of the pressure medium thus becomes a parameter to represent the vehicle height which varies with the vapor pressure of the pressure medium. Therefore, a signal from the temperature sensor 17 and a signal from a vehicle height setting device 19 are inputted into a controller 18 which is made up of a vehicle-mounted computer and which controls the electric charging to the electric heater 16. A comparison is made between that temperature of the pressure medium which corresponds to the vehicle height set by the vehicle height setting device 19 and a detected temperature detected by the temperature sensor 17. The electric charging to the electric heater 16 is then controlled by means of feedback control such that the deviation between the two becomes zero. Reference numeral 20 in FIG. 2 denotes a peep hole which is provided in the case 12.

The electric heater 16 is constituted by a bar heater made up of a conventional plug-type heater which is used as a glow plug in a diesel engine. This bar heater 16 is horizontally inserted into the pressure chamber 13 through a connector portion 12c which is provided in the case 12, and is fitted at its tail portion into the connector portion 12c in a threaded manner. According to this arrangement, the work of mounting and dismounting of the electric heater 16 becomes easy, resulting in an improvement in the ease with which the maintenance is performed. In addition, since the bar heater 16 is disposed in a horizontal posture at the bottom of the pressure chamber 13, a wide space in the vertical direction can be secured between the bar heater 16 and the damper main body 1. The influence on the suspension stroke thus becomes smaller. The temperature sensor 17 is also inserted into the pressure chamber 13 in a horizontal posture through a connector portion 12d which is provided in the case 12, and is fitted at its tail portion into the connector portion 12d in a threaded manner.

On an end wall at the bottom end of the case 12, which is the bottom inner surface of the pressure chamber 13, there is provided a spacer member 21 which is made of a resin and which is prevented from rotating by means of a projection 12e on the end wall. A recessed groove 21a is formed in the spacer member 21 so that the bar heater 16 can be contained inside the recessed groove 21a. According to this arrangement, the recessed groove 21a serves as a sump portion for containing therein the pressure medium "a" in the liquid state. Even if the angle of inclination of the damper toward the inside as seen in the width direction of the vehicle decreases as a result of the extension motion of the damper, in a state in which the liquid level of the pressure medium has considerably lowered, the bar heater 16 will not be exposed to the liquid surface. The quantity of the pressure medium may consequently be smaller. In addition, by making the spacer member 21 of a resin to thereby secure the thermal insulating property, the heat of the bar heater 16 can be prevented from being dissipated outside. The heating efficiency can thus be improved.

Figure 3:
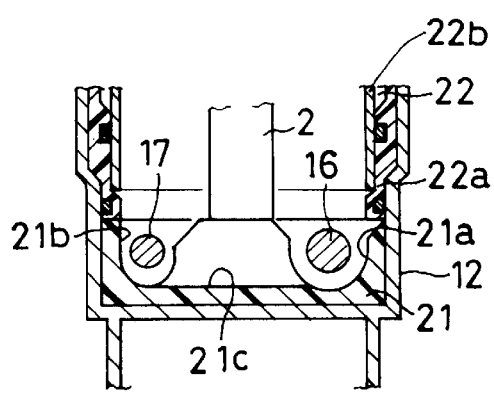
FIG. 3 is a sectional view taken along the line III—III in FIG. 2.
Figure 4:
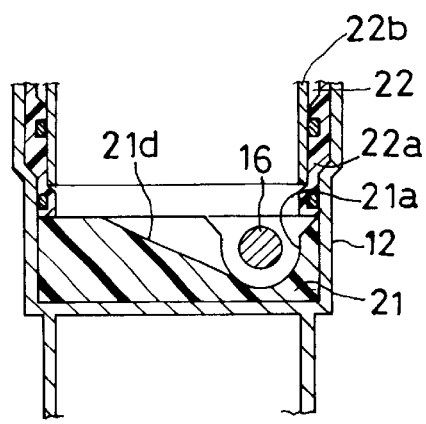
FIG. 4 is a sectional view taken along the line IV—IV in FIG. 2.

In addition to the above-described recessed groove 21a, the spacer member 21 has formed therein, as shown in FIGS. 3 and 4, a recessed groove 21b for containing therein the temperature sensor 17, a communicating groove 21c to communicate both the recessed grooves 21a, 21b together, and a guide groove 21d which introduces the condensed pressure medium into the recessed groove 21a for the heater. The contraction motion of the damper is restricted by the bump stop rubber $10_1$ before the damper main body 1 comes into contact with the spacer 21.

By the way, when the ambient temperature becomes high, the vapor pressure of the pressure medium inside the pressure chamber 13 becomes high, resulting in a high vehicle height. As a solution, in the present embodiment, a jacket portion 22 is formed in the vehicle height adjusting section 11, and the subframe SF is provided with a reserve tank 23 for storing therein a coolant such as water or the like, and a pump 24. While the electric charging to the bar heater 16 is stopped, if the detected temperature detected by the temperature sensor 17 has exceeded that temperature of the pressure medium which corresponds to the vehicle height set by the vehicle height setting device 19, the pump 24 is operated by the controller 18. The coolant is thus caused to be circulated between the jacket portion 22 and the reserve tank 23 to cool the pressure medium so that the vapor pressure can be lowered.

The jacket portion 22 is constituted in the following manner. Namely, an annular recessed portion on an inner surface of a resin sleeve 22a which is fitted into the inside of the case 12 is covered, in a hermetically sealed manner, by a metallic sleeve 22b such as of aluminum make or the like which is superior in heat transfer property as well as in corrosion resistivity. The pressure medium is thus cooled by heat exchanging, through the metallic sleeve 22b, between the coolant that flows through the jacket portion 22 and the pressure medium.

An outer surface of the case 12 is provided with connecting ports 22c, 22c on an inlet side and an outlet side, respectively, which are in communication with the jacket portion 22. Metallic piping members 25, 25 which are connected to both the connecting ports 22c, 22c through flexible hoses 25a, 25a are combined by means of brazing or the like with the suspension arm 9 to which the damper rod 2 is coupled. The reserve tank 23 and the pump 24 are connected to the piping materials 25, 25 through flexible hoses 25b, 25b. According to this arrangement, the suspension arm 9 functions as a heat radiating fin which is thermally connected to the piping materials 25. The coolant which is heated in the jacket portion 22 is effectively cooled by the wind that flows along the surface of the suspension arm 9. In this manner, without providing a special heat exchanger for cooling the coolant, a good cooling efficiency of the pressure medium in the jacket portion 22 can be maintained.

An explanation has so far been made about the embodiment in which the present invention is applied to a hydraulic damper. However, the present invention can also be similarly applicable to dampers such as a friction damper or the like other than the hydraulic damper.

What is claimed is:

1. A damper with a vehicle height adjusting function, said damper being of an inverted type which is provided with a damper main body and a damper rod which is inserted from a bottom side into said damper main body so as to be movable up and down, wherein a cylindrical case which is coupled to said damper rod is provided outside said damper main body so as to be movable up and down, wherein a pressure chamber containing therein, in a hermetically sealed manner, a pressure medium which varies between a liquid state and a gaseous state is provided between said damper main body and said case, and wherein an electric heater is provided inside said pressure chamber to heat and evaporate the pressure medium, characterized in:

that said electric heater is formed into a bar heater; and
that said bar heater is horizontally inserted into a bottom portion of said pressure chamber through a connector portion which is provided in said case such that a tail portion of said bar heater is fitted in a threaded manner into said connector portion.

2. A damper with a vehicle height adjusting function according to claim 1, wherein said bar heater is provided so as to be positioned on an inner side, as seen in a width direction of a vehicle, relative to said damper rod in a state in which the damper is mounted on the vehicle.

3. A damper with a vehicle height adjusting function according to claim 1, wherein a spacer member having formed therein a recessed groove for containing therein said bar heater is provided on an inner bottom of said pressure chamber.

4. A damper with a vehicle height adjusting function according to claim 3, wherein said spacer member is made of a resin.

5. A damper with a vehicle height adjusting function according to claim 1, wherein a jacket portion through which a coolant flows and which comes into thermal contact with said pressure chamber is provided; and wherein that piping member for the coolant which is connected to said jacket portion is combined with a suspension arm to which said damper rod is coupled.

* * * * *